Jan. 3, 1933.　　　F. K. FILDES　　　1,892,698
TRANSPORTATION CONTAINER
Filed Nov. 6, 1931　　2 Sheets-Sheet 2
FIG. II.
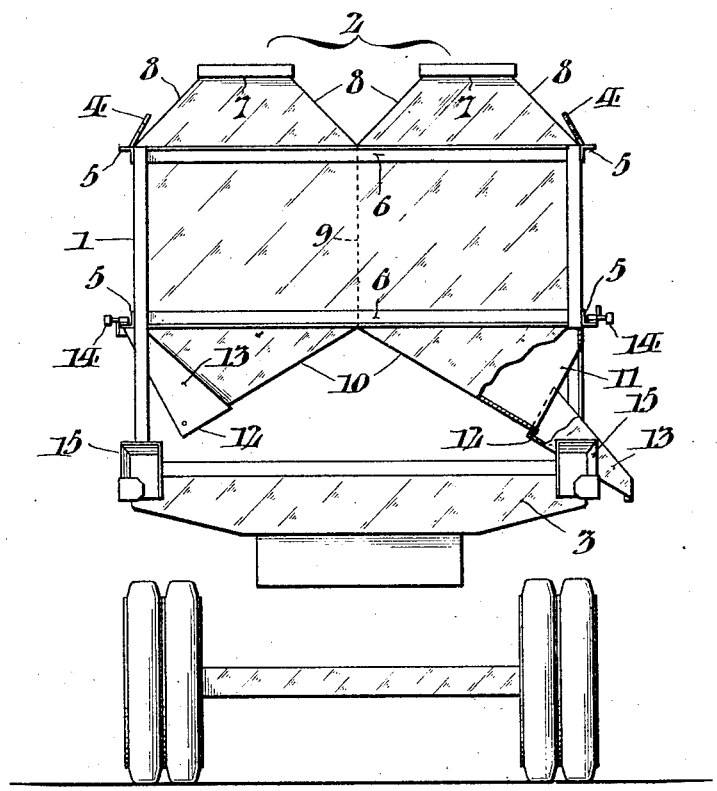
WITNESSES:　　　　　　　　　　INVENTOR:
　　　　　　　　　　　　　　Frederick K Fildes,
　　　　　　　　　　　　　BY
　　　　　　　　　　　　　　　　ATTORNEYS.

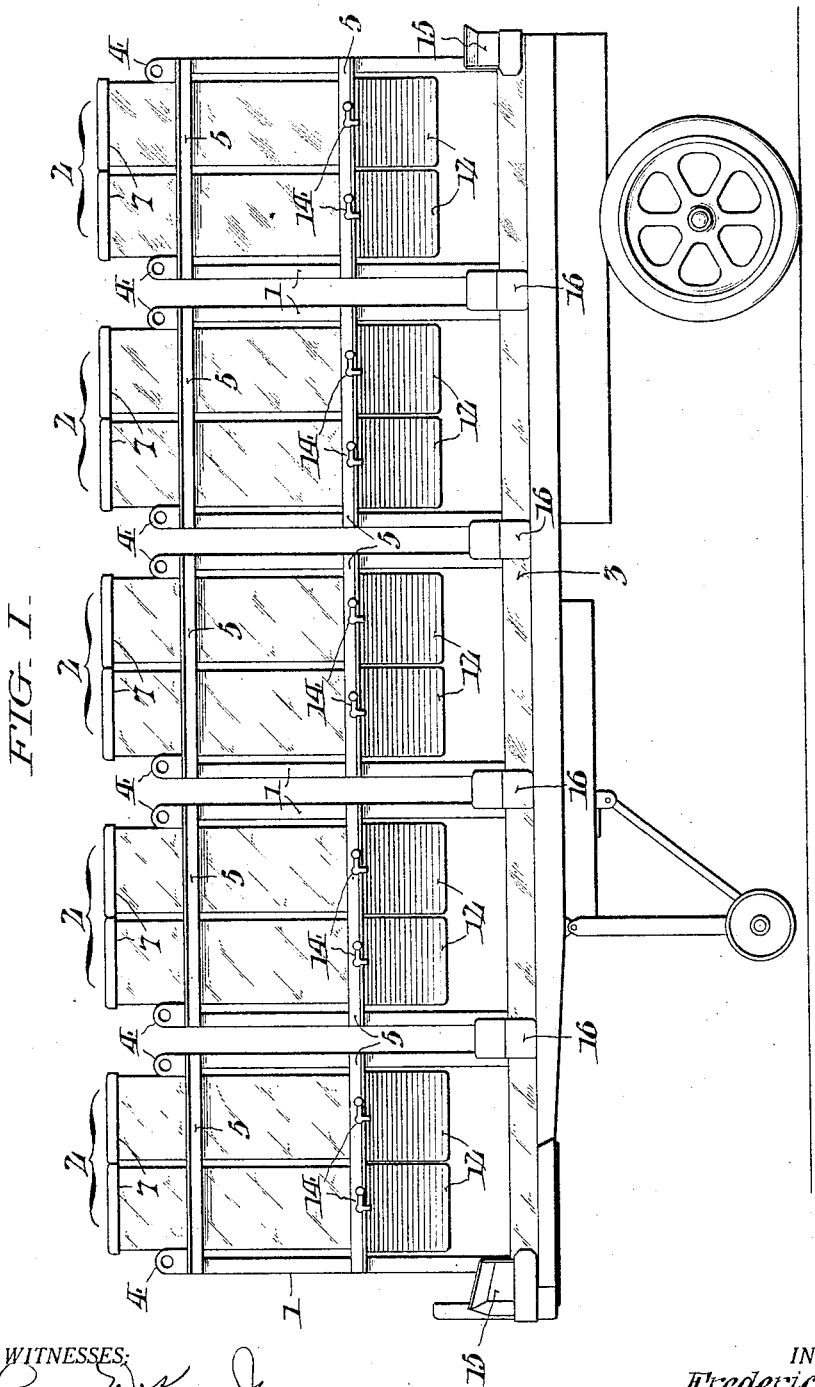

Patented Jan. 3, 1933

1,892,698

UNITED STATES PATENT OFFICE

FREDERICK K. FILDES, OF ALTOONA, PENNSYLVANIA

TRANSPORTATION CONTAINER

Application filed November 6, 1931. Serial No. 573,338.

My invention, while relating generally to transportation containers, has particular relation to removable containers adapted for use on freight cars, motor trucks or other vehicles for the transportation of bulk freight, such as cement, sand, or the like. Heretofore containers for carrying bulk freight have been made of a size so that a number of them situated side by side in either double or single rows are conveniently accommodated on the floor of a railroad freight car or other vehicle. Such containers are customarily provided with drop-bottom doors and are handled by means of cranes or like hoisting apparatus which shift them from one platform to another or position them for dumping, it being necessary to raise the containers from the platform or vehicle floor before the contents can be discharged. It frequently happens, however, that the materials are carried to points having no unloading equipment or hoisting apparatus. For example, it may be desirable to carry cement containers by rail and then by motor truck to the scene of a road building operation, where no facilities are available for removing the containers from the motor truck.

Accordingly, the object of my invention is to provide a form of removable container which is adapted to be handled in the manner customary to railroad shipping containers, but which possesses the further advantage that the contents may be discharged without utilizing a crane or like hoisting apparatus and without the services of an unloading crew. More specially, my invention is characterized by a box-like frame of a width corresponding to a vehicle platform, and a plurality of bins disposed side by side within said frame, each having bottom closure means by which its contents may be discharged over the side of the vehicle platform while the container rests thereon. Thus the practice of my invention involves a marked saving in time and labor as compared to the use of drop-bottom containers or the like which require some type of lifting apparatus for the discharge of the contents.

Further objects and advantages of the invention will be apparent from the description hereinafter of one embodiment or example thereof, the description having reference to the accompanying drawings. Of the drawings:

Fig. I represents a side elevation of several containers in place on a transportation vehicle; and, Fig. II represents an end view of the same, with the hinged door of one bin dropped as in discharge.

In the particular embodiment of my invention shown in the drawings, the removable transportation container is made up of two major elements, viz: a box-like frame 1 and a plurality of bins 2 disposed side by side within said frame. The frame 1 is of a width corresponding to the width of the platform 3 of the vehicle upon which the containers rest and is of a length such that five containers occupy the full floor space of the vehicle, a conventional type of semi-trailer being selected for illustration as the carrier for transporting the containers. At each top corner of a container frame 1, fittings 4 in the form of eyes are provided to serve as attachments which are adapted to be engaged by lifting apparatus. Within each container frame 1 four bins 2 are accommodated, the bins being snugly fitted within the longitudinal and transverse frame members designated respectively at 5 and 6. Each bin 2 is rectangular in cross section and is provided at its top with a fill opening 7. From the fill openings 7, walls are inclined outwardly and downward, as indicated at 8 to the top of the frame 1 where they merge with vertical walls 9. At the bottom of each bin a slope sheet 10 is provided leading to an opening 11 at the side of the container. The angle given to the slope sheet is steep enough to allow the contents, say cement, to flow readily by gravity towards the opening. At the opening 11 of the base of each bin, a closure member 12 in the form of a door is hinged, the hinges being located about the extreme lower edge of the bottom slope sheet 10, so that when the door is swung downward, as shown at the right hand of Fig. II, it serves as a chute facilitating the discharge by gravity of the contents of the bin over the sides of the vehicle platform upon which the container rests. Moreover, each door 12 is preferably provided with upturned sides 13, which when the door is closed overlap the opposite walls 9 of the bin to effect a seal at the door opening. The bin doors 12 are locked by means of latches 14 attached to the lower longitudinal frame members 5.

The carriers used for the transportation of the containers are preferably provided with corner stakes 15 and intermediate stakes 16 which define rectangular pockets within which the containers are seated, the stakes 15 and 16 being so designed that they do not interfere with the discharge of the contents of the bins 2.

Each container may be filled in place on a vehicle or filled when off a vehicle and then swung into place by a crane or like hoisting apparatus. The hinged doors are locked carefully before filling is begun. An example of the handling and operation of the described containers is as follows.

At the plant of a cement manufacturer, railway cars carrying a complement of containers resting on the car bottoms may be filled by means of gravity chutes leading to the fill openings 7 of the several containers. The containers may then be carried by a rail to a station near their ultimate destination and there transferred by overhead cranes to semi-trailers with platforms corresponding in width to the width of the freight car and in length to, say, the space occupied by five containers placed end to end. Thereupon the containers may be carried by semi-trailers drawn by motor vehicles to the particular site where the cement is to be used. When the containers have reached their destination, the contents are discharged by tripping the latch 14 of each bin, allowing its bottom closure member 12 to swing down over the edge of the platform of the carrier vehicle to form a chute. The steep angle of the bottom slope sheet 10 causes the contents to slide down by gravity, and pass through the chute which preferably extends outward at the same angle as the bottom slope sheet. When the discharge is completed, the closure member 12 is swung up and latched in place as a door closing the discharge opening 11.

Thus the discharge of the contents of the bins is accomplished quickly and easily without any unloading apparatus.

While I have described one form or embodiment which this invention may take, it will be apparent, especially to those skilled in the art that various changes may be made in the form of transportation container herein described and illustrated without departing from the spirit of the invention as defined in the appended claim.

Having thus described my invention, I claim:—

A container comprising a box-like frame of a width corresponding to a vehicle platform, and bins fitting snugly within said frame on each side of its center line, each of said bins having vertical walls, a bottom slope sheet extending from the center line of the frame to an opening at the side thereof, and a door pivoted at said opening and overlapping opposite walls of the bin, said door being normally locked substantially within the confines of the frame and being adapted when released to fall to a position extending outward beyond the platform upon which the container rests to serve as a chute facilitating the discharge by gravity of the contents of the bin.

In testimony whereof, I have hereunto signed my name at Altoona, Pennsylvania, this 30th day of October, 1931.

FREDERICK K. FILDES.